US007134984B2

(12) United States Patent
Takada et al.

(10) Patent No.: US 7,134,984 B2
(45) Date of Patent: Nov. 14, 2006

(54) FUEL CUT CONTROL SYSTEM FOR INTERNAL COMBUSTION ENGINE

(75) Inventors: Hiroshi Takada, Tochigi (JP); Hiroyuki Takenaka, Shizuoka (JP); Tetsuo Enomoto, Tochigi (JP); Kenichiro Murakami, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 254 days.

(21) Appl. No.: 10/930,962

(22) Filed: Sep. 1, 2004

(65) Prior Publication Data

US 2005/0049111 A1 Mar. 3, 2005

(30) Foreign Application Priority Data

Sep. 3, 2003 (JP) ............................ 2003-311373

(51) Int. Cl.
*B60W 10/04* (2006.01)

(52) U.S. Cl. ........................ 477/110; 477/107; 477/111

(58) Field of Classification Search ................ 477/107, 477/109, 110, 111
See application file for complete search history.

(56) References Cited

U.S. PATENT DOCUMENTS 5,168,975 A 12/1992 Bernhardt et al.
5,390,637 A * 2/1995 Yoshioka et al. ........... 123/333
5,433,676 A * 7/1995 Abe et al. .................... 477/109
5,694,902 A * 12/1997 Miwa et al. ................ 123/493
6,190,284 B1 2/2001 Kuroda et al.
6,334,499 B1 * 1/2002 Matsubara et al. ........ 180/65.2
6,334,835 B1 1/2002 Tanaka et al.
6,656,089 B1 * 12/2003 Furukawa .................. 477/111

FOREIGN PATENT DOCUMENTS

DE 41 34 268 A1 4/1992
EP 1 034 957 A2 9/2000
FR 2 695 684 A1 3/1994
JP 1-247734 * 10/1989
JP 10-30477 A 2/1998

* cited by examiner

*Primary Examiner*—Ha Ho
(74) *Attorney, Agent, or Firm*—Foley & Lardner LLP

(57) ABSTRACT

A fuel cut control system for an internal combustion engine is arranged to generate a fuel cut command when a predetermined engine operating condition is satisfied, to start a fuel cut of stopping a fuel supply to engine when a delay time elapses from a moment at which the fuel cut command is generated, and to shorten the delay time when the fuel cut command is generated during a downshift of a transmission drivingly connected with the engine.

10 Claims, 4 Drawing Sheets

FIG.3

DOWNSHIFT CUT-IN DELAY TIME Tcdd (sec.) (WHERE Tcdd<Tcdm)

| GEAR AFTER DOWNSHIFT | 1 | 2 | 3 | 4 |
|---|---|---|---|---|
| Tcdd (sec.) | 0 | 0.1 | 0.2 | 0.3 |

FIG.4

DOWNSHIFT CUT-IN DELAY TIME Tcdd (sec.) (WHERE Tcdd<Tcdm)

| GEAR BEFORE DOWNSHIFT \ GEAR AFTER DOWNSHIFT | 1 | 2 | 3 | 4 |
|---|---|---|---|---|
| 1 | — | — | — | — |
| 2 | 0.2 | — | — | — |
| 3 | 0.1 | 0.2 | — | — |
| 4 | 0 | 0.1 | 0.2 | — |
| 5 | 0 | 0 | 0.1 | 0.2 |

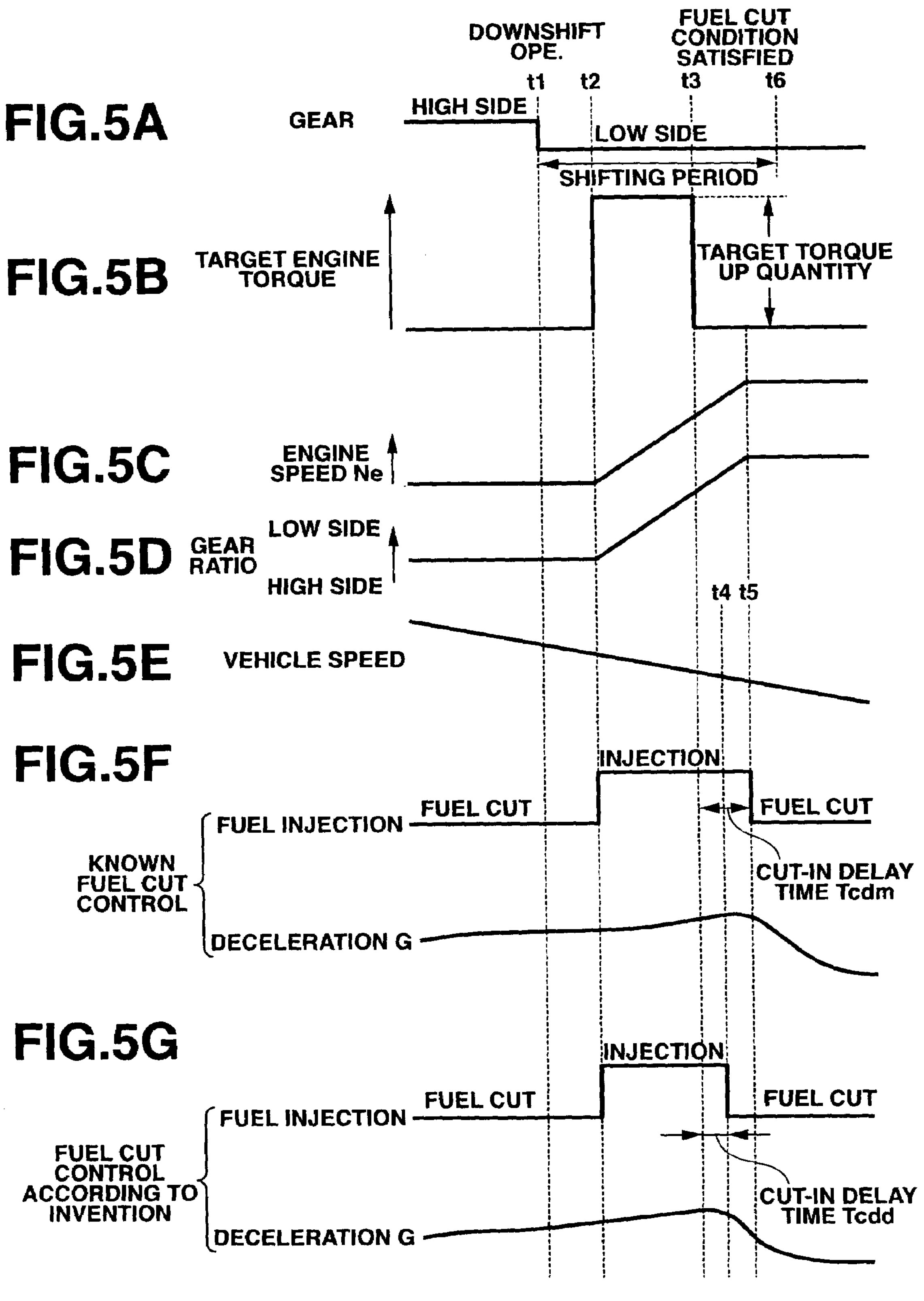
FIG.5A
FIG.5B
FIG.5C
FIG.5D
FIG.5E
FIG.5F
FIG.5G
DOWNSHIFT OPE.
FUEL CUT CONDITION SATISFIED
t1 t2 t3 t6
GEAR
HIGH SIDE
LOW SIDE
SHIFTING PERIOD
TARGET ENGINE TORQUE
TARGET TORQUE UP QUANTITY
ENGINE SPEED Ne
GEAR RATIO
LOW SIDE
HIGH SIDE
t4 t5
VEHICLE SPEED
KNOWN FUEL CUT CONTROL
FUEL INJECTION
FUEL CUT
INJECTION
FUEL CUT
CUT-IN DELAY TIME Tcdm
DECELERATION G
FUEL CUT CONTROL ACCORDING TO INVENTION
FUEL INJECTION
FUEL CUT
INJECTION
FUEL CUT
CUT-IN DELAY TIME Tcdd
DECELERATION G

FUEL CUT CONTROL SYSTEM FOR INTERNAL COMBUSTION ENGINE

BACKGROUND OF THE INVENTION

The present invention relates to a fuel cut control for an internal combustion engine, and more particularly to a fuel cut control system which executes a fuel cut control during a downshift of a transmission drivingly connected with an internal combustion engine.

Japanese Published Patent Application No. 10-30477 discloses a fuel cut control system which is arranged to start a fuel cut when a predetermine time elapses from outputting a fuel cut command in response to the establishment of a fuel cut condition, and to decrease a torque shock at the start of the fuel cut by retarding an ignition timing of an engine within the predetermined time.

SUMMARY OF THE INVENTION

However, this known fuel cut control system has a problem that since a cut-in delay time from the generation of the fuel cut command to the start of the fuel cut is determined regardless of a shift control of a transmission, the start of the fuel cut does not advance even when a downshift is executed in response to engine brake requested by a driver or transmission controller. This arrangement of the known fuel cut control system, therefore, has a possibility that the engine brake increase demand of the driver during the downshift is not satisfied with this known fuel cut control.

It is therefore an object of the present invention to provide a fuel cut control system for an internal combustion engine, which system determines a cut-in delay time between the output of a fuel cut command and a start of the fuel cut in relation to a shift control of a transmission so as to obtain an engine brake without generating an undesired delay when a downshift for requesting an engine brake is executed.

An aspect of the present invention resides in a fuel cut control system which is for an internal combustion engine and comprises a controller. The controller is arranged to generate a fuel cut command when a predetermined engine operating condition is satisfied, to start a fuel cut of stopping a fuel supply to the engine when a delay time elapses from a moment at which the fuel cut command is generated and to shorten the delay time when the fuel cut command is generated during a downshift of a transmission drivingly connected with the engine.

A further aspect of the present invention resides in a fuel cut control system which is for an internal combustion engine of an automotive vehicle. The fuel cut control system comprises a vehicle operating condition detector which detects an operating condition of the vehicle including the engine and a transmission drivingly connected with the engine, a fuel injector which injects fuel into each cylinder of the engine, and a controller which is connected with the vehicle operating condition detector and the fuel injector. The controller is arranged to determine whether a fuel cut condition is satisfied, to determine whether a downshift of the transmission is being executed, to shorten a delay time when the fuel cut condition is satisfied during the downshift, and to command the fuel injector to stop a fuel supply when the delay time elapses from a moment of determining that the fuel cut condition is satisfied.

Another aspect of the present invention resides in a method of executing a fuel cut control for an internal combustion engine which comprises an operation of generating a fuel cut command when a predetermined engine operating condition is satisfied, an operation of starting a fuel cut of stopping a fuel supply to the engine when a delay time elapses from a moment at which the fuel cut command is generated, and an operation of shortening the delay time when the fuel cut command is generated during a downshift of a transmission drivingly connected with the engine.

The other objects and features of this invention will become understood from the following description with reference to the accompanying drawings.

BRIEF DESCRIPTION OF THE DRAWINGS

FIG. 3 is a table showing a relationship between a downshift cut-in delay time Tcdd and a gear selected after downshift.

FIG. 4 is a table showing a relationship between downshift cut-in delay time Tcdd and a difference between a gear set before downshift and a gear selected after downshift.

FIGS. 5A through 5G are time charts explaining a difference between a known art and the present invention.

DETAILED DESCRIPTION OF THE INVENTION

Referring to FIGS. 1 through 5G, there is discussed an embodiment of a fuel cut control system for an internal combustion engine in accordance with the present invention.

Figure 1:
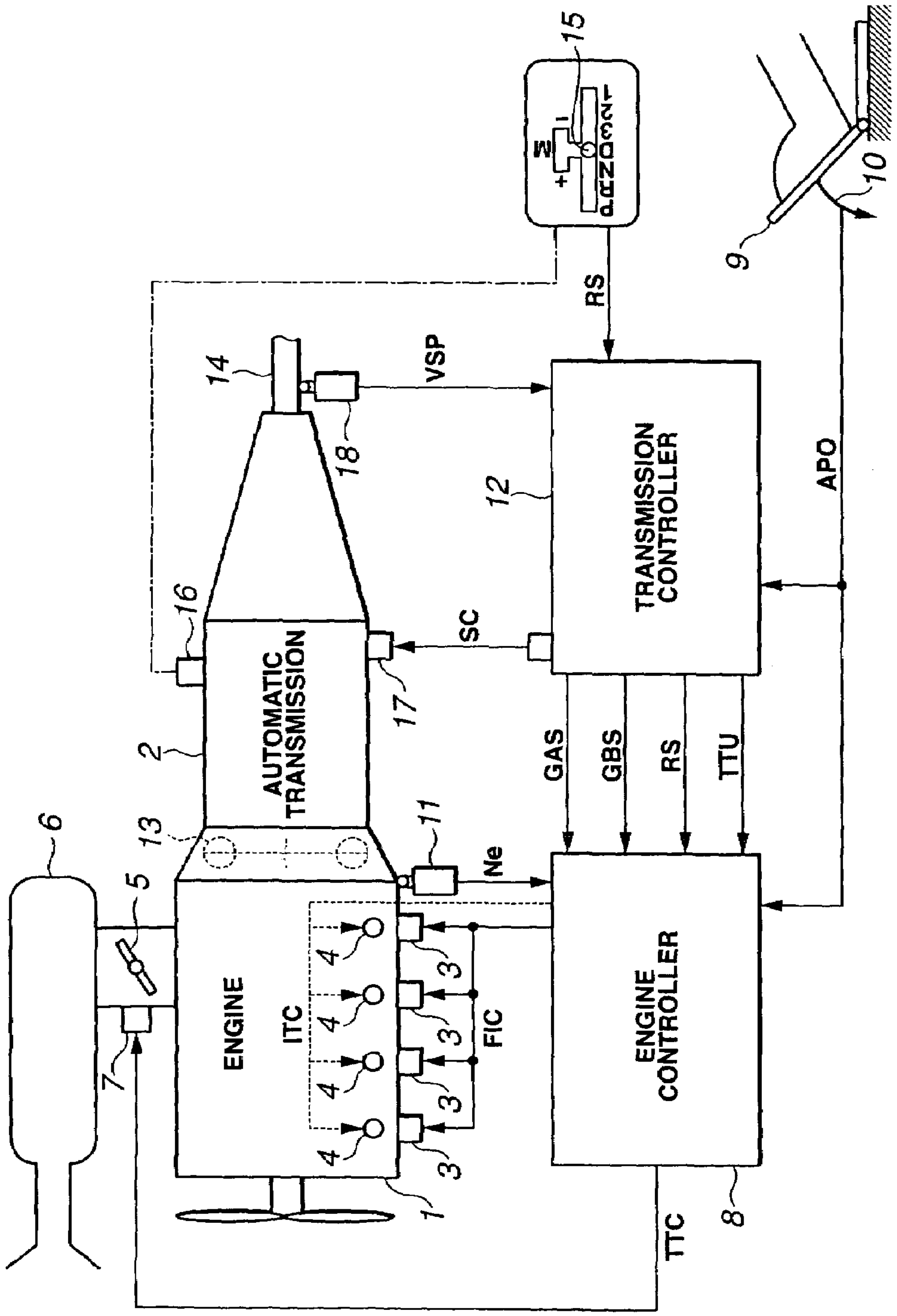
FIG. 1 is a schematic view showing a power train including a fuel cut control system according to an embodiment of the present invention and a control system of the power train.

As shown in FIG. 1, a vehicle power train comprises internal combustion engine 1 which includes the fuel cut control system according to the present invention, an automatic transmission 2, and a control system thereof.

Engine 1 comprises a fuel injector 3, a spark plug 4 and a throttle valve 5 by each cylinder thereof. Throttle valve 5 controls an air quantity to be supplied from an air cleaner 6 into each cylinder of engine 1 according to an opening of throttle valve 5.

Fuel injector 3 opens for an opening period according to a fuel injection command FIC, and therefore injects a quantity of fuel corresponding to the opening period into the corresponding cylinder in synchronization with the revolution of engine 1.

Each spark plug 4 executes an ignition operation for each cylinder according to an ignition timing command ITC in synchronization with the revolution of engine 1.

Engine 1 executes a predetermined operation by igniting a mixture of air measured by throttle valve 5 and fuel injected from fuel injector 3. The engine output of engine 1 is controlled by controlling a throttle opening of throttle valve 5.

A throttle actuator 7 controls the throttle opening of throttle valve 5 according to a target throttle opening command TTC.

An engine controller 8 determines target throttle opening command TTC, fuel injection command FIC, and injection timing command ITC.

In order to determined the above-discussed commands TTC, FIC and ITC, engine controlled 8 receives an accelerator opening indicative signal APO which represents a depression quantity of accelerator pedal 9 and is detected by accelerator opening sensor 10, an engine speed indicative signal Ne which represents an engine speed of engine 1 and is detected by an engine speed sensor 11, and other signals.

Target throttle opening command TTC, which is determined by engine controller 8 and is sent to throttle actuator 7, is basically a command value corresponding to the accelerator opening APO.

Additionally, when a transmission controller 12 outputs a command of a target torque up quantity TTU to engine controller 8 as shown by the operation during a period from a moment t2 to a moment t3 in FIG. 5B, in order to improve the shift responsibility of automatic transmission 2 by quickly increasing the input revolution speed of automatic transmission 2 during the downshift to the revolution speed after shifting, engine controller 8 increases target throttle opening command TTC by a throttle opening up quantity corresponding to target torque up quantity TTU, more specifically, sets target throttle opening command TTC at a value corresponding to the sum of accelerator opening APO and the throttle opening up quantity corresponding to target torque up quantity TTU. This arrangement improves the above-discussed shift responsibility of automatic transmission 2.

Engine controller 8 further functions as a fuel cut control system for stopping a fuel supply to engine 1, by keeping fuel injector 3 into a closed state through the stop of outputting fuel injection command FIC to fuel injector 3. Hereinafter, there is discussed the fuel cut control executed by engine controller 8 in detail.

Although automatic transmission 2 shown in FIG. 1 is a five-speed type automatic transmission, a continuously variable transmission may be employed instead of this five-speed type automatic transmission. An input shaft of automatic transmission 2 is connected with a crankshaft of engine 1 through a torque converter 13 so as to output the inputted engine revolution to an output shaft 14 thereof upon varying the engine revolution according to a gear ratio of the select gear of automatic transmission 2.

Automatic transmission 2 comprises a manual valve 16 which is connected with a shift lever 15 manipulated by a driver. By controlling manual valve 16 through the manipulation of shift lever 15, automatic transmission 2 selects one of shift ranges including a parking (P) range, a reverse (R) range, a neutral (N) range, a forward automatic drive (D) range, a third speed engine brake (3) range, a second speed engine brake (2) range, a first speed engine brake (1) range and a manual shift (M) range. Further, automatic transmission 2 executes a shift control according to the select range.

Automatic transmission 2 comprises a shift solenoid unit 17 to execute the shift control. Shift solenoid unit 17 controls automatic transmission 2 to achieve the shifting so as to select a gear ratio corresponding to the shift command SC in response to the shift command SC of transmission controller 12.

Transmission controller 12 receives a range signal RS indicative of a selected range position of shift lever 14, accelerator opening signal APO outputted from accelerator sensor 10, and a vehicle speed indicative signal VSP detected by a vehicle speed sensor 18 which obtains the vehicle speed on the basis of a revolution speed of output shaft 14 of automatic transmission 2.

Transmission controller 12 obtains a suitable gear ratio on the basis of a predetermined shift map, accelerator opening APO and vehicle speed VSP when D range is selected. Further, transmission controller 12 outputs the shift command SC corresponding to the obtained gear ratio to shift solenoid unit 17.

When one of third speed brake (3) range, second speed brake (2) range and first speed brake (1) range is selected, shift controller 12 determines a shift command SC to be supplied to shift solenoid unit 17 so as to enable an engine brake running at the third speed by prohibiting an upshift to a gear which is higher in speed than that of the third speed, or so as to enable an engine brake running at the second speed by prohibiting an upshift to a gear which is higher in speed than that of the second speed, or so as to enable an engine brake running at the first speed by prohibiting an upshift to a gear which is higher in speed than that of the first speed.

When M range is selected, transmission controller 12 determines the shift command SC supplied to shift solenoid unit 17, by each lever operation of shift lever 15 toward a plus (+) position so that automatic transmission 2 is upshifted to one-step upper side, and determines the shift command SC to shift solenoid unit 17 by each lever operation of shift lever 15 toward a minus (−) position so that automatic transmission is downshifted to one-step lower side.

Accordingly, transmission controller 12 can determine that a downshift of requesting engine brake is executed, when the range is changed to third speed brake (3) range, second speed brake (2) range, or first speed brake (1) range under a condition that accelerator 9 is released and when D range is selected or when shift lever 15 is manipulated toward the minus (−) position immediately after M range is selected.

Subsequently, there is discussed the fuel cut control basically executed by engine controller 8.

Engine controller 8 receives range signal RS necessary for determining the downshift of requesting engine brake, a signal indicative of a gear before the downshift GBS and a signal indicative of a gear after the downshift GAS, in addition to accelerator opening APO and engine speed Ne.

Figure 2:
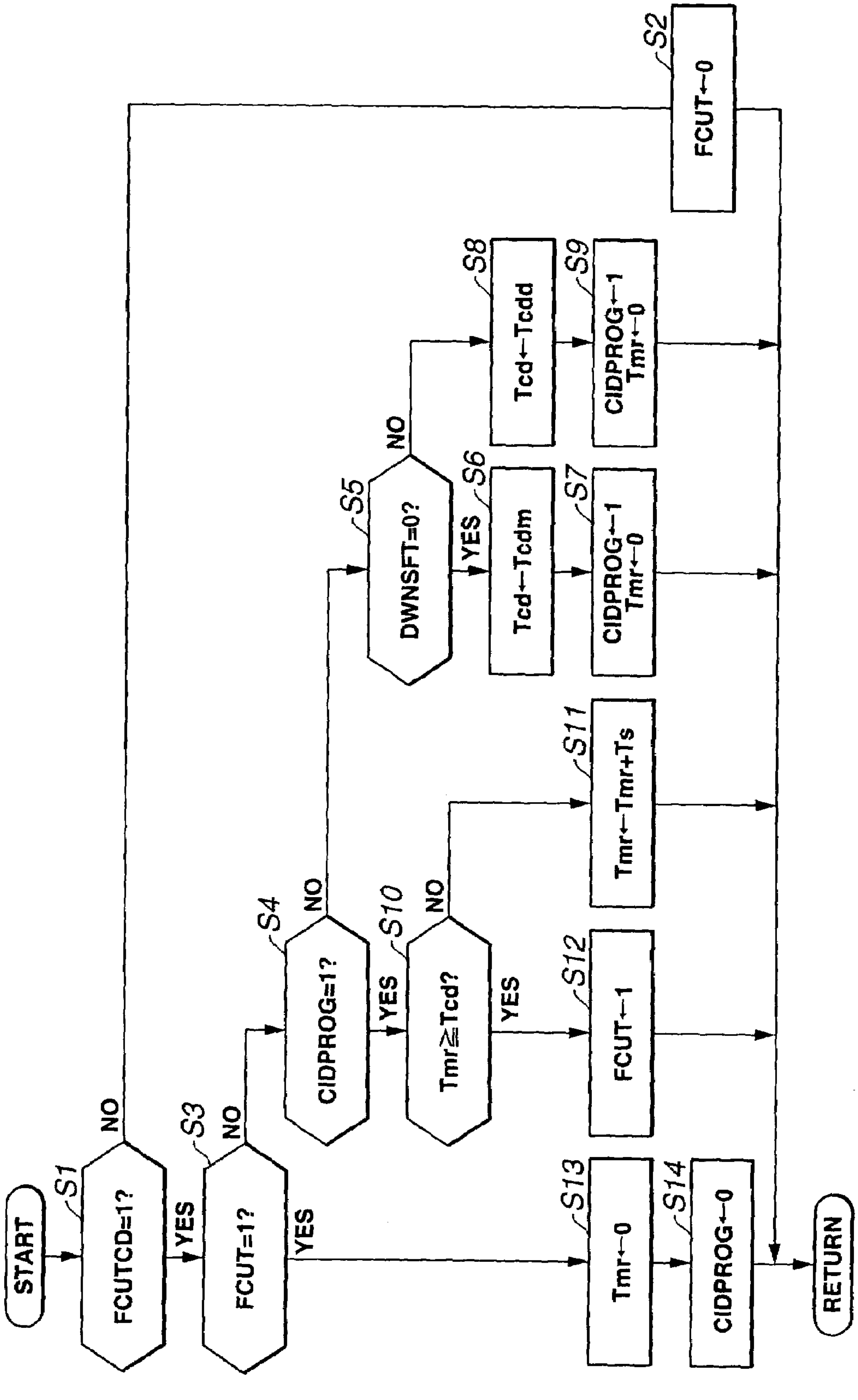
FIG. 2 is a flowchart showing a control program executed by an engine controller in order to execute a fuel cut control according to the present invention.

Engine controller 8 executes a control program shown in FIG. 2 on the basis of the above-discussed inputted information to execute the fuel cut control according to the present invention. There may be executed a commonly-known control of decreasing the torque difference at the start of fuel cut by executing the ignition timing retard control as disclosed in Japanese Published Patent Application No. 10-30477, in addition to the control shown in FIG. 2.

At step S1 shown in FIG. 2, engine controller 8 determines whether or not a condition of executing the fuel cut of engine 1 is satisfied, by determining whether or not a fuel cut condition satisfying flag FCUTCD is set at 1. The fuel cut execution condition includes, for example, a condition that accelerator opening APO is 0 (APO=0) and engine speed Ne is higher than or equal to a revolution speed at which it is possible to operate engine 1 at a timing of the fuel re-injection (a fuel recovery engine speed). As far as the fuel cut execution condition is satisfied, fuel cut condition satisfying flag FCUTCD is set at 1 (FCUTCD=1). When the fuel cut execution condition is not satisfied, fuel cut condition satisfying flag FCUTCD is set at 0 (FCUTCD=0).

When the determination at step S1 is negative, that is, when FCUTCD≠1, the program proceeds to step S2 wherein a fuel cut command flag FCUT of commanding a fuel cut is set at 0 (FCUT←0), Then, the present routine is terminated, and the program proceeds to the next routine. Thus, when FCUT=1, the fuel cut is not executed.

When the determination at step S1 is affirmative, that is, when FCUTCD=1, the program proceeds to step S3 wherein engine controller 8 determines whether or not the fuel cut is being executed already, by determining whether or not fuel cut command flag FCUT is set at 1.

When the determination at step S3 is negative (FCUT=0), that is, when the fuel cut is not executed, the program proceeds to step S4 wherein engine controller 8 determines whether or not a cut-in delay execution flag CIDPROG is set at 1. The cut-in delay execution flag CIDPROG is set at 1 at step S7 or S9 when a delay time Tcd from an establishment of the fuel cut condition to an actual execution of the fuel is set at step S6 or S8. Accordingly, when the fuel cut condition has just been established, cut-in delay execution flag CIDPROG is yet set at 1 (CIDPROG=1). Therefore, the program proceeds from step S4 to step S5.

At step S5 engine controller 8 determines whether or not a downshift execution flag DWNSFT is set at 0. Downshift execution flag DWNSFT is set at 1 (DWNSFT=1) when engine controller 8 determines on the basis of range signal RS that a downshift of requesting engine brake is being executed. When engine controller 8 determines at step S5 that the downshift of requesting engine brake is not being executed, downshift execution flag DWNSFT is set at 0 (DWNSFT=0).

When the determination at step S5 is affirmative (DWNSFT=0), that is, when it is determined that the downshift of requesting engine brake is not being executed, the program proceeds to step S6 wherein engine controller 8 sets a normal cut-in delay time Tcdm as cut-in delay time Tcd (Tcd←Tcdm). The normal cut-in delay time Tcdm is determined, for example, so as to decrease as engine speed Ne increases.

Subsequent to the execution of step S6, the program proceeds to step S7 wherein cut-in delay execution flag CIDPROG is set at 1 (CIDPROG=1), and an elapsed-time counter for measuring an elapsed time Tmr from a moment of establishing the fuel cut condition is reset at 0 (Tmr=0). Then, the present routine is terminated, and the program proceeds to the next routine.

When the determination at step S5 is negative, that is, when engine controller 8 determines that the downshift of requesting engine brake is being executed, the program proceeds to step S8 wherein engine controller 8 sets a downshift cut-in delay time Tcdd as cut-in delay time Tcd (Tcd←Tcdd). The downshift cut-in delay time Tcdd is set at a predetermined value. More specifically, candidate values shown in FIG. 3 are previously stored in a read only memory ROM connected with engine controller 8, and engine controller 8 selects one of the candidate values according to the selected gear after the downshift, as downshift cut-in delay time Tcdd. In FIG. 3, the selected cut-in delay time Tcdd is set at a smaller value as the gear after downshift becomes a lower gear. Further, as shown in FIG. 4, the cut-in delay time Tcdd may be determined on the basis of the relationship between the gear before downshift and the gear after downshift, such that the cut-in delay time is shortened as the downshift quantity increases is apparently shown in FIG. 4.

Subsequent to the execution of step S8, the program proceeds to step S9 wherein cut-in delay execution flag CIDPROG is set at 1 (CIDPROG=1), and a count Tmr of the elapsed-time counter is reset at 0 (Tmr=0). Then, the present routine is terminated, and the program proceeds to the next routine.

By setting cut-in delay execution flag CIDPROG at 1 at step S7 or S9, it becomes possible that the program in the next routine can proceed from step S4 to step S10. Accordingly, at step S10 engine controller 8 determines whether or not the elapsed time Tmr reached cut-in delay time Tcd.

When the determination at step S10 is negative (Tmr<Tcd), the program proceeds to step S11 wherein the count Tmr of the elapsed-time counter is incremented by a calculation cycle Ts and continues conut-up. Then, the present routine is terminated. Since in this routine the processing of setting fuel cut command flag FCUT at 1 is not executed, the start of the fuel cut is delayed (the cut-in delay is continued).

When the determination at step S10 is affirmative (Tmr≧Tcd), that is, when engine controller 8 determines that the elapsed time Tmr reached the cut-in delay time Tcd, the program proceeds to step S12 wherein fuel cut command flag FCUT is set at 1 (FCUT=1). Then, the present routine is terminated, and the program proceeds to the next routine.

During when FCUT=1, engine controller 8 executes the fuel cut. Therefore, the fuel cut starts at a moment when the elapsed time Tmr reached cut-in delay time Tcd.

Since fuel cut command flag FCUT is set at 1 at step S12, in the next routine, it becomes possible that the program in the next routine can proceed from step S3 to steps S13 and S14.

At step S13 subsequent to the affirmative determination at step S3, engine controller 8 resets count Tmr of the elapsed-time counter at 0 (Tmr=0). At step S14 subsequent to the execution of step S14, engine controller 8 resets cut-in delay execution flag CIDPROG at 0 (CIDPROG=0). Then, the present routine is terminated, and the program proceeds to the next routine.

Even when the fuel cut is being executed, engine controller 8 checks whether or not the fuel cut condition is being satisfied.

When accelerator pedal 9 is depressed (APO>0), or when engine speed Ne becomes smaller than a fuel recovery engine speed, engine controller 8 determines that the fuel cut condition is not satisfied, and, therefore the fuel cut condition satisfying flag FCUTCD is set at 0 (FCUTCD=0) to terminate the fuel cut.

Hereinafter, there is discussed advantages of the thus arranged fuel cut control according to the present invention with reference to FIGS. 5A through 5G.

In FIGS. 5F and 5G, there are disclosed time charts of a compared known art and the present invention. In these time charts, at a moment t1 during a vehicle speed decreasing state, when a driver manipulates shift lever 15 toward the minus (−) side in M range, or when transmission controller 12 commands the downshift to shift solenoid unit 17 under a condition that one of D range, 3 range and 2 range is selected, transmission controller 12 calculates a target gear and applies a shift command SC to shift solenoid unit 17 so that automatic transmission accomplishes the downshift operation within a shift period ranging from moment t2 to moment t6.

During a period from moment t2 to moment t3 in the shift period, engine controller 8 outputs target throttle opening command TTC taking account of target torque up quantity TTV independently from accelerator opening APO to improve the shift responsibility. Accordingly, engine speed Ne starts increasing at moment t2, and a transmission ratio (Ni/No) also starts increasing toward the low side, wherein Ni is an input revolution speed of automatic transmission 2, and No is an output revolution speed of automatic transmission 2. At moment t5, input revolution speed Ni of automatic transmission 2 increases to a revolution speed after downshift.

When at moment t3 target throttle opening TTC is set at 0, the above-discussed fuel cut condition is satisfied. Therefore, the fuel cut control according to the present invention is arranged to set downshift cut-in delay time Tcd at time Tcdd which is shorter than normal cut-in delay time Tcdm so that the fuel cut starts at a moment t4 which time Tcdd elapses from moment t3. This enables a deceleration G to be quickly generated.

However, in case of the known or normal fuel cut control, a cut-in delay time is not affected by the present or absence of a downshift operation. Therefore, the fuel cut starts at moment t5 at which time Tcdm elapses from moment t3. Accordingly, engine brake is generated after moment t5 and deceleration G is also generated after moment t5. Therefore, the responsibility of the conventional fuel cut is inferior to the responsibility of the fuel cut executed in the fuel cut control according to the present invention.

With the thus arranged fuel cut control according to the present invention, in case that both of first and second condition are established where the first condition is that APO=0 and the second condition is that FCUTCD=1, when DWNSFT=0, the fuel cut is executed from a moment at which normal cut-in delay time Tcdm elapses from the establishment of the fuel cut condition. Further, when DWNSFT=1, cut-in delay time is set at downshift cut-in delay time Tcdd, and therefore the fuel cut is executed from a moment at which time Tcdd shorter than time Tcdm elapses.

Therefore, in case that a downshift is executed according to the driver's engine-brake request, the engine brake is quickly generated as compared with the operation of the know fuel cut control. This satisfies the driver's request.

Further, since cut-in delay time Tcd is arranged to become shorter as the gear after downshift is lower as shown in FIG. 3, the generation of engine brake becomes more quickly as the gear after downshift becomes lower. This further satisfies the driver's request.

Furthermore, since cut-in delay time Tcd may be arranged to become shorter as the downshift quantity increases as shown in FIG. 4, the generation of engine brake becomes more quickly as the downshift quantity increases. This further satisfies the driver's request.

This application is based on Japanese Patent Application No. 2003-311373 filed on Sep. 3, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A fuel cut control system for an internal combustion engine, comprising:

a controller arranged to generate a fuel cut command when a predetermined engine operating condition is satisfied;

to start a fuel cut of stopping a fuel supply to the engine when a delay time elapses from a moment at which the fuel cut command is generated; and to shorten the delay time when the fuel cut command is generated during a downshift of a transmission drivingly connected with the engine.

2. The fuel cut control system as claimed in claim 1, wherein the controller is further arranged to decrease the delay time as a gear selected after the downshift becomes lower.

3. The fuel cut control system as claimed in claim 1, wherein the controller is further arranged to decrease the delay time as a difference between a gear before the downshift and a gear after the downshift increases.

4. The fuel cut control system as claimed in claim 1, wherein the predetermined engine operating condition includes a condition that an accelerator opening of a throttle valve is zero and an engine speed is higher than or equal to a revolution speed at which it is possible to operate the engine at a timing of a fuel re-injection after the fuel cut.

5. The fuel cut control system as claimed in claim 1, wherein the delay time varies within a range from 0 to 0.3 second.

6. The fuel cut control system as claimed in claim 2, wherein the delay time is set at 0 second when the gear selected after the downshift is a first gear, the delay time is set at 0.1 second when the gear selected after the downshift is a second gear, the delay time is set at 0.3 second when the gear selected after the downshift is a third gear, and the delay time is set at 0.3 second when the gear selected after the downshift is a fourth gear.

7. The fuel cut control system as claimed in claim 3, wherein the delay time is set at 0 second when the difference between the gear before the downshift and the gear after the downshift is three steps or more, the delay time set at 0.1 second when the difference is two steps, and the delay time set at 0.2 second when the difference is one step.

8. A fuel cut control system for an internal combustion engine of an automotive vehicle, comprising:

a vehicle operating condition detector detecting an operating condition of the vehicle including the engine and a transmission drivingly connected with the engine;

an fuel injector injecting fuel into each cylinder of the engine; and a controller connected with the vehicle operating condition detector and the fuel injector, the controller being arranged to determine whether a fuel cut condition is satisfied, to determine whether a downshift of the transmission is being executed, to shorten a delay time when the fuel cut condition is satisfied during the downshift, and to command the fuel injector to stop a fuel supply when the delay time elapses from a moment of determining that the fuel cut condition is satisfied.

9. A method of executing a fuel cut control for an internal combustion engine, comprising:

generating a fuel cut command when a predetermined engine operating condition is satisfied;

starting a fuel cut of stopping a fuel supply to engine when a delay time elapses from a moment that the fuel cut command is generated; and shortening the delay time when the fuel cut command is generated during a downshift of a transmission drivingly connected with the engine.

10. A fuel cut control system for an internal combustion engine, comprising:

commanding means for generating a fuel cut command when a predetermined engine operating condition is satisfied;

fuel cut executing means for starting a fuel cut of stopping a fuel supply to the engine when a delay time elapses from a moment at which the fuel cut command is generated; and cut-in delay time changing means for shortening the delay time when the fuel cut command is generated during a downshift of a transmission drivingly connected with the engine.

* * * * *